though, or an ammonia solution is

3,012,908
PROCESS FOR THE PRODUCTION OF PHOSPHORUS COMPOUNDS AND THEIR USE IN FIREPROOFING

Xavier Bilger, Soisy-sur-Montmorency, France, assignor to Compagnie Francaise des Matières Colorantes, Paris, France, a French company
No Drawing. Filed Feb. 12, 1960, Ser. No. 8,233
Claims priority, application France Feb. 13, 1959
10 Claims. (Cl. 117—137)

The present invention concerns a process for the preparation of phosphorus compounds, and their use in fireproofing.

In French Patent No. 1,157,097, filed on August 1, 1956, there is described a process for the manufacture of phosphorus compounds and the use of these compounds in the fireproofing of fibrous cellulosic materials. The process for the manufacture of these substances consisted in reacting ammonia with an intermediate product of the general formula $P_nN_{n-1}Cl_{2n+3}$, in the presence of an inert solvent, and under precisely controlled conditions. The result of this process is to replace, at least partly, the chlorine atoms of the intermediate product by amino groups. For use, the amino derivatives produced in this manner must be brought into solution. This solution can be prepared only by heating these products in the presence of water, and this operation, which is accompanied by hydrolysis, constitutes a complication from the user's point of view.

It has now been found that if the intermediate products having the general formula given above are made to react first with methyl alcohol and then with ammonia, new fireproofing substances are produced which clearly differ from those of the French patent and which have, by comparison therewith, numerous advantages. Thus, for example:

(a) They are readily soluble in water without previous hydrolysis and this property makes it possible to produce uniform fireproofing effects in all cases;

(b) They can be produced and stored as aqueous concentrated solutions which can be easily handled, and (c) They impart to cellulosic fibres excellent fireproofing properties, which are much more stable than those obtained with the former amino derivatives.

In the preparation of the new products according to the invention, the step of reacting methyl alcohol with an intermediate compound of the general formula $$P_nN_{n-1}Cl_{2n+3}$$

is advantageously effected at a temperature between —20° C. and +50° C., and preferably between 0° C. and 20° C. This reaction is accompanied by the liberation of heat and the temperature should be maintained within the specified limits by external cooling.

The intermediate compounds in question may be used alone or in the presence of an inert solvent. The presence of a small quantity of inert solvent gives particularly interesting results. Suitable inert solvents are, for example, tetrachloroethane, trichloroethylene, carbon tetrachloride, benzene, toluene or chlorobenzene.

The solutions of the intermediate compounds of French Patent No. 1,157,097 contain, as solvent, tetrachlorethane, which can conveniently be distilled off. However, this preliminary distillation may be avoided, if a comparatively much smaller amount of tetrachloroethane is used in the process. The intermediate compounds, prepared in this manner, may then be treated directly with methyl alcohol.

In the step of reacting with ammonia this is preferably added in anhydrous form; for example, gaseous ammonia is bubbled through, or an ammonia solution is added to an anhydrous solvent, such as methyl alcohol. The quantities of ammonia added are preferably calculated so that the ratio gram molecules $NH_3$:gram atoms P is between 1 and 4.

The ammonium chloride formed as a result of the reaction with the ammonia is separated by filtration. The filtrate is then distilled in order to remove the excess methyl alcohol and any inert solvent which is present. The resulting products are solid, of light brown colour, soluble in water, brittle, highly hygroscopic, and soften under heat. In view of their hygroscopic properties, they are more expediently stored as solutions, for example, as concentrated aqueous solutions. In order to produce these solutions, it is unnecessary to distil off the whole of any inert solvent used. It is, in fact, sufficient to add the water to the distillation residue as any remaining inert solvent separates from he aqueous solution and may be removed by decanting.

These aqueous solutions can be improved by the addition of softening agents, water repellents or fungicidal agents. The addition of buffer substances has particularly advantageous results and suitable buffer substances are, for example, the alkaline salts of acetic, boric, phosphoric, pyrophosphoric, metaphosphoric, thiocyanic or fluoboric acid or nitrogenous compounds, such as formamide, hydrazine, urea, thiourea, cyanamide or hexamethylene tetramine.

The exact constitution of the fireproofing substances of this invention has not yet been determined. However, analysis shows that in the intermediate starting products of formula $P_nN_{n-1}Cl_{2n+3}$ the major part—if not all—of the chlorine atoms are substituted, on the one hand by $OCH_3$ groups, and on the other hand by $NH_2$ groups. The schematic formula which best illustrates these observations is the following:

$$P_nN_{n-1}Cl_x(NH_2)_y(OCH_3)_z$$

in which $x+y+z=2n+3$.

The products obtained by the present process are suitable for the fireproofing of cellulosic fibres. For this purpose they may be applied thereto in aqueous solution, for example, by soaking, foularding, mixing or spraying. The impregnated fibres are dried at temperatures below 100° C. or at 100° C. The fibres are then subjected to heat treatment at a temperature above 100° C. in order to fix the fireproofing substances. Then they are rinsed in water, so as to remove the unfixed substances. Fibres treated in this manner have fireproofing properties with excellent stability to water, weather and hard washing, even when repeated.

The following examples, in which the parts indicated are parts by weight, illustrate but do not limit the present invention.

Example 1

100 parts of the orange liquid A of Example 1 of French Patent No. 1,157,097 are cooled to 5–10° C. The temperature is maintained at this level between 5° C. and 10° C., the liquid is agitated, and 150 parts of methyl alcohol are added thereto very slowly. After completion of the addition, gaseous ammonia is bubbled through the mixture, whilst the external cooling and the flow of the ammonia are so adjusted that the temperature of the mixture does not exceed 20° C. After 34 parts of ammonia have been absorbed, the mixture is allowed slowly to regain ambient temperature, and agitation is continued for 12 to 15 hours. The separated ammonium chloride is filtered and the excess methyl alcohol evaporated from the filtrate. One obtains a residue of brownish colour, which is brittle and highly hygroscopic. It is crushed and kept in the absence of moisture.

Example 2

(A) 417 parts of phosphorus pentachloride, 92 parts of ammonium chloride and 150 parts of symmetrical tetrachloroethane are placed into an apparatus, equipped with an agitator, a reflux cooler and a thermometer. The mixture, which is mostly solid, is heated to melting point, that is, to about 90° C. to 110° C. The mixer is then set in motion, and heating is continued until the temperature of the reaction mixture has become stable at about 147° C. It is then possible to observe a slight reflux of tetrachloroethane and a liberation of gaseous hydrochloric acid. With the heating kept constant, the boiling temperature remains stable at 147° C. for about six hours, then falls over half-an-hour to 145° C., and then rises during the following two hours to about 155° C. This rise of the boiling temperature is accompanied by an intensive liberation of gaseous hydrochloric acid. After reaching 155° C. the boiling temperature drops again whilst, at the same time, the liberation of hydrochloric acid decreases, and becomes negligible, when the boiling temperature of the reacting mixture has dropped to about 140° C. The heating is then discontinued, and the mixture cooled to ambient temperature. One obtains a reaction product in the form of a clear orange liquid, in which there form a few yellow crystals.

(B) The orange liquid is cooled to 0° C. and pure methyl alcohol is very slowly run in. A strong exothermic reaction takes place; the speed of addition of the methyl alcohol and the cooling must be adjusted in such a way that the temperature of the medium is kept between 0° C. and 10° C. Altogether 320 parts of methyl alcohol are added. One obtains a light brown mixture, containing a small quantity of insolubles. The temperature of this mixture is kept between 0° C. and +10° C., and 84 parts of gaseous, anhydrous, ammonia are bubbled through during a period of 3 to 4 hours. Ammonium chloride separates slowly as a white precipitate, its quantity increases gradually in accordance with the absorption of ammonia. The mixture is slowly allowed to regain room temperature, and agitation is continued for 12 to 15 hours. The ammonium chloride is separated by filtration. One obtains about 190 to 200 parts of residue and 540 to 560 parts of filtrate. Then follows, under agitation, evaporation by distilling the excess methyl alcohol and the chlorinated solvents, first at atmospheric pressure and then at a pressure of 250 mms. of mercury, whilst heating to 100° C. The evaporation is stopped when the mixture has acquired the consistency of a thick paste. Then 60 parts of water are added over 15 minutes, the mixture is cooled to room temperature, and allowed to stand for one day. 60 to 70 parts of a heavy liquid consisting substantially of tetrachloroethane are deposited. This is separated and the slightly cloudy, amber-coloured, aqueous phase is collected. One obtains a viscous liquid with a density of the order of 1.35 to 1.40.

The percentage composition of the dry residue, found by analysis, is the following:

| | Percent |
|---|---|
| P | 28.1 |
| N | 25.3 |
| C | 13.5 |
| Cl | 7.8 |
| H | 6.6 |
| O | 18.7 | which corresponds substantially to a product with the average formula $P_4N_3Cl(OCH_3)_5(NH_2)_5$.

Example 3

The procedure of Example 2 is followed, but 99 parts of ammonia are absorbed instead of 84 parts. The gas is bubbled through over a period of about 4 hours whilst the temperature is kept at between 5° C. and 10° C. One obtains 210 parts of a concentrated aqueous solution of a phosphorus compound to which are added 20 parts of urea, and agitation is continued for 1 to 2 hours. The urea dissolves, and the final product comprises 230 parts of an amber-coloured, viscous liquid with a density of 1.37.

Example 4

The procedure of Example 3 is followed, but 115 parts of ammonia are absorbed over 4 to 5 hours, instead of 99 parts. The final result is 240 parts of a clear, brown, viscous liquid.

Example 5

The procedure of Example 2 is followed, using the same quantities of reagents, but adding to the final product 20 parts of urea and continuing agitation until the urea is completely dissolved.

Example 6

(A) Using the procedure of Example 2, 417 parts of phosphorus pentachloride are condensed with 92 parts of ammonium chloride in the presence of 150 parts of symmetrical tetrachloroethane.

(B) The condensate so produced is cooled to a temperature of 0° C. to +5° C. It is agitated, and a mixture of 200 parts of benzene and 166 parts of methyl alcohol is added slowly, whilst the temperature is maintained between 0° C. and 10° C. Gaseous ammonia is bubbled through by means of a plunger tube, until 84 parts have been absorbed. After filtration, the solvent is evaporated by heating the reaction mixture, first under atmospheric pressure to 80° C.–85° C., and continuing the heating at 90° C. under a pressure of 500 mms. of mercury. The reaction mixture becomes pasty and thickens. Then 70 parts of water are slowly added. One obtains a viscous, brown, cloudy liquid. After allowing the same to stand for one night, it separates into two layers. The lower layer, consisting substantially of tetrachloroethane (75 parts) is removed, and the upper layer collected. One obtains 213 parts of a product consisting of a concentrated aqueous solution of amber colour.

Example 7

16.7 parts of the product of Example 1 are dissolved in 50 parts of water, 3 parts of formamide are added, and the mixture made up to 100 parts by adding water. A piece of cotton twill fabric, having a weight of 330 grammes per square metre, is placed into the bath thus prepared, squeezed out to 90%, dried in an oven at 80° C. and subjected to heat treatment at 140° C. for five minutes. After rinsing in tepid water and drying, the fabric treated in this way is fireproof.

The following table shows the stability of the fireproofing effect to washing. These washing operations having a duration of 30 minutes were carried out in baths at 100° C., containing 0.5% of Marseilles soap, and 0.2% of anhydrous sodium carbonate. After rinsing and drying, the fireproofed samples were subjected to the fireproofing test according to the French Standards (Order of September 4, 1951, Official Gazette of October 9, 1951, page 10245).

| Number of washings | 3 | 4 | 6 | 7 |
|---|---|---|---|---|
| Carbonized surface in sq. cm | 13 | 20 | 27 | 23 |

Example 8

The products of Examples 2 to 6, applied as specified in Example 7, give fireproofing results, the stability of which to washing shown in the following table. This table also indicates the differences, from the aforementioned Example 7.

| Product of Example No. | Weight of Product | Nature and weight of buffer substance | Final weight of the bath | Percentage rate of expression | Heat treatment | | Carbonized surface after— | | | | | | | | | |
|---|---|---|---|---|---|---|---|---|---|---|---|---|---|---|---|---|
| | | | | | Duration, mins. | Temp., °C. | 0 | 1 | 2 | 3 | 4 | 5 | 6 | 7 | 8 | 9 |
| | | | | | | | washings | | | | | | | | | |
| 2 | 16.2 | 3 Hydrazine (Hydrate). | 75 | 90 | 5 | 140 | | | | | 18 | 18 | 22 | 22 | 19 | |
| 2 | 16.2 | 3 Urea | 75 | 92 | 5 | 140 | | | | | 19 | 19 | 19 | 17 | 14 | |
| 3 | 19 | | 75 | 89 | 5 | 140 | | | | | | | 25 | >60 | | |
| 4 | 19.5 | | 75 | 90 | 5 | 140 | | | | | | | 23 | >60 | | |
| 5 | 19 | | 75 | 91 | 5 | 140 | | | | | | 13 | 26 | 21 | 21 | >60 |
| 5 | 100 | | 350 | 80 | 10 | 140 | 29 | 26 | | 25 | | 34 | 35 | 34 | | |
| 5 | 100 | | 350 | 80 | 5 | 140 | | | | | | 24 | | 27 | | |
| 5 | 100 | | 350 | 80 | 3 | 140 | | | | | | 32 | | 54 | | |
| 6 | 16.7 | 2 Urea | 75 | 91 | 5 | 140 | | | | | 15 | 15 | 22 | 22 | 18 | |

I claim:

1. Process for the preparation of a phosphorus compound which comprises reacting an intermediate phosphorus compound having the general formula $P_nN_{n-1}Cl_{2n+3}$ in which $n$ is an integer greater than 1 with methyl alcohol and then with anhydrous ammonia the ratio of gram molecules of ammonia to gram atoms of phosphorus being between 1 and 4.

2. Process as claimed in claim 1 in which the reaction with the methyl alcohol is effected at a temperature between $-20°$ C. and $+50°$ C.

3. Process as claimed in claim 2 in which the temperature is maintained between $-20°$ C. and $+50°$ C. by external cooling.

4. Process as claimed in claim 1 in which the reaction with methyl alcohol is effected at a temperature between $0°$ C. and $20°$ C.

5. Process as claimed in claim 1 in which the reaction with the methyl alcohol and the ammonia is effected in the presence of an inert solvent.

6. Process as claimed in claim 5 in which the inert solvent is symmetrical tetrachloroethane.

7. Process as claimed in claim 1 in which the ammonia is gaseous.

8. Process for the fireproofing of fibrous cellulosic material which comprises applying thereto an aqueous solution of a phosphorus compound prepared by reacting an intermediate phosphorus compound of the general formula $P_nN_{n-1}Cl_{2n+3}$ in which $n$ is an integer greater than 1 with methyl alcohol and then with anhydrous ammonia the ratio of gram molecules of ammonia to gram atoms of phosphorus being between 1 and 4, drying the treated fibrous material and then heating it to a temperature greater than $100°$ C.

9. Process as claimed in claim 8 in which the aqueous solution also contains a buffer substance.

10. Fibrous cellulosic materials fireproofed by means of a phosphorus compound prepared by reacting an intermediate phosphorus compound of the general formula $P_nN_{n-1}Cl_{2n+3}$ in which $n$ is an integer greater than 1 with methyl alcohol and then with anhydrous ammonia the ratio of gram molecules of ammonia to gram atoms of phosphorus being between 1 and 4.

References Cited in the file of this patent

UNITED STATES PATENTS 2,909,446     Redfarn et al.     Oct. 29, 1959

FOREIGN PATENTS 1,157,097     France     Dec. 23, 1957